United States Patent Office 3,519,551
Patented July 7, 1970

3,519,551
**REACTOR FOR THE DECOMPOSITION OF LIQ-
UID HYDROCARBONS BY THE ELECTRIC
DISCHARGE PROCESS**
Natan Saulovich Pechuro, Frunzenskaya nab. 40, kv. 28, and Oleg Jurievich Pesin, Mytnaya ul. 16, kv. 38, both of Moscow, U.S.S.R.
Filed July 26, 1967, Ser. No. 656,101
Int. Cl. C07c 3/48
U.S. Cl. 204—325        3 Claims

ABSTRACT OF THE DISCLOSURE

A reactor for the decomposition of liquid hydrocarbons comprises a pair of rotatable electrodes immersed in the liquid hydrocarbons and having opposed end faces spaced from one another with overlapping regions forming an arc zone. Also mounted within the liquid hydrocarbons are scrapers adjacent the end faces of the electrodes outside the arc zone for removal of solid decomposition products from the surfaces.

---

This invention relates to chemical installations and apparatus, and more specifically it relates to reactors for the decomposition of liquid hydrocarbons by the electric discharge process. The electric discharge process (electric cracking) for the decomposition of liquid hydrocarbons produces a gas containing up to 30–32% acetylene, an acetylene concentration unattainable by other processes for the production of acetylene from hydrocarbon feedstock, and also yields substantial quantities of lower olefines and hydrogen. The electric discharge process has a marked advantage in that the consumption of electric power is low (8–10 kw.-hr. per cu.m. $C_2H_2$/STP), another notable feature being that use can be made of diverse feedstocks ranging from low-boiling low-grade gasolines to heavy petroleum products and tars.

In prior art reactors for the decomposition of liquid hydrocarbons by the electric discharge process it is customary to employ two coaxial electrodes mounted on the reactor walls in such a manner that one electrode is made stationary, whilst the other electrode can be displaced along its axis with a view to varying the interelectrode distance (cf. U.S. Pat. No. 1,830,615, Oct. 3, 1931).

The known reactors of this type have a major limitation in that the solid products and carbon black formed in the course of liquid feedstock decomposition deposit on the working surface of the electrodes and adversely affect arc stability. With the arcs of a high flux density, the rate of deposit formation is so high that the reactor can be operated continuously for a period of several minutes only. To resume reactor operation, the electrodes should be subjected to cleaning.

The aforementioned disadvantages preclude the commercial utilization of said reactors.

It is an object of the present invention to eliminate the aforementioned disadvantages and to provide a reactor that will make it possible to continuously remove carbon deposits from the working surfaces of electrodes and, hence, to accomplish a continuous electric discharge process for the decomposition of liquid hydrocarbons.

According to the present invention, this object is accomplished by making the electrodes rotatable about their longitudinal axes and by mounting scrapers outside the discharge zone but close to the working surface of the electrodes, the scrapers being intended for the removal of solid decomposition products from the electrode working surfaces.

In a specific embodiment of the reactor, according to the invention, it is expedient to make the electrodes so that the projection of the butt end of one electrode will butt partially overlap the butt end of the other electrode.

It is advantageous to make the adjacent ends of the electrodes in the form of disks in which provision is made on the periphery for through-holes intended for an additional removal of gaseous decomposition products, said through-holes being disposed on one or several circumferences concentric with the axis of electrode rotation. The electrode butt ends are furnished with annular grooves, which accommodate said through-holes, whilst in the scrapers provision is made for projections, whose shape and number correspond to the shape and number of the grooves.

In another embodiment of the reactor, according to the present invention, the working surfaces are comprised of electrode lateral surfaces, the preferred practice being to make the electrodes in the form of cones with opposedly directed apices.

The following stable results were obtained when an experimental reactor, according to the present invention, was operated continuously for several hours on a feedstock comprised of a petroleum product having an initial boiling point of 126° C. and an end boiling point of 233° C.:

(1) Composition of cracking gas, vol. percent:
acetylene and acetylene homologues—29.8.
lower olefines—9.2.
hydrogen—58.5.
paraffin hydrocarbons—2.5.

(2) Yield per 1 kg. of decomposed feedstock:
cracking gas—890 g. (570 g. of acetylene inclusive).
carbon black—110 g.

(3) Feedstock consumption—2.03 kg. per cu.m. $C_2H_2$ (STP).

(4) Power consumption—8.6 kg.-hr. per cu.m. $C_2H_2$ (STP).

Shown in the accompanying drawings are exemplary embodiments of diverse modifications of the reactor for the decomposition of liquid hydrocarbons by the electric discharge process, according to the present invention, wherein:

FIG. 1 presents the reactor with disk electrodes (longitudinal section);

Figure 5:
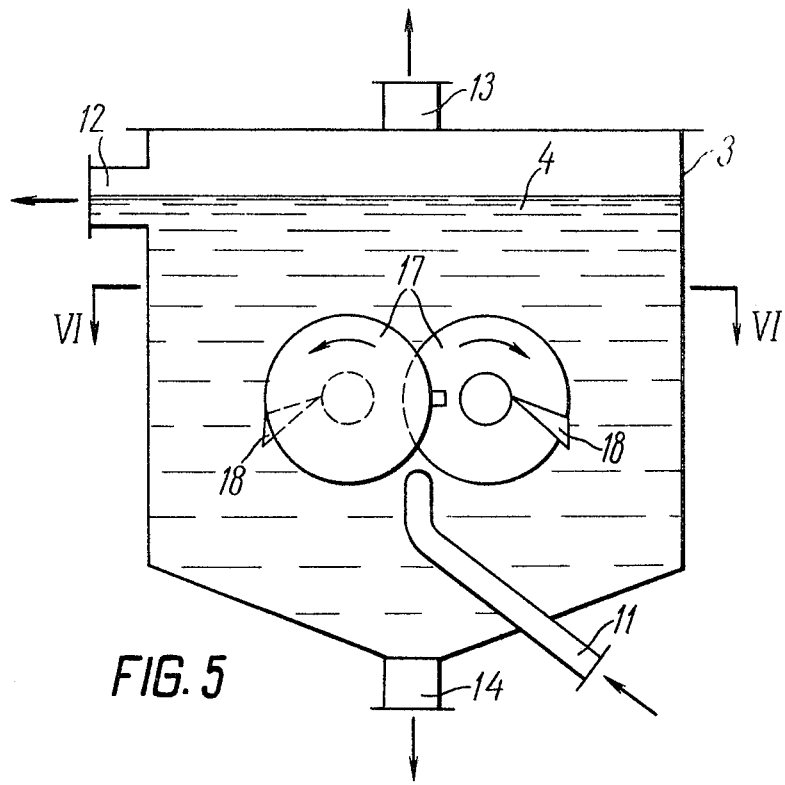
Figure 6:
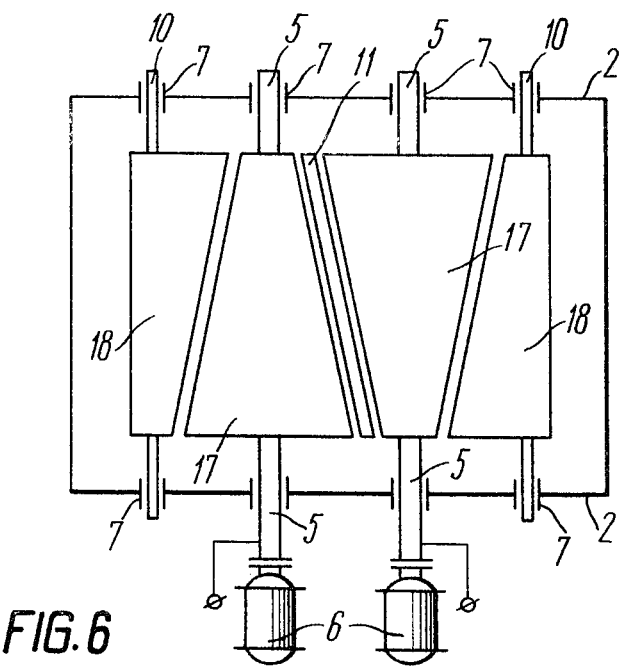

FIG. 5 presents a modified reactor with conical electrodes whose lateral surface serves as the working surface; and FIG. 6 is a sectional view taken on line VI—VI of FIG. 5.

Figure 1:
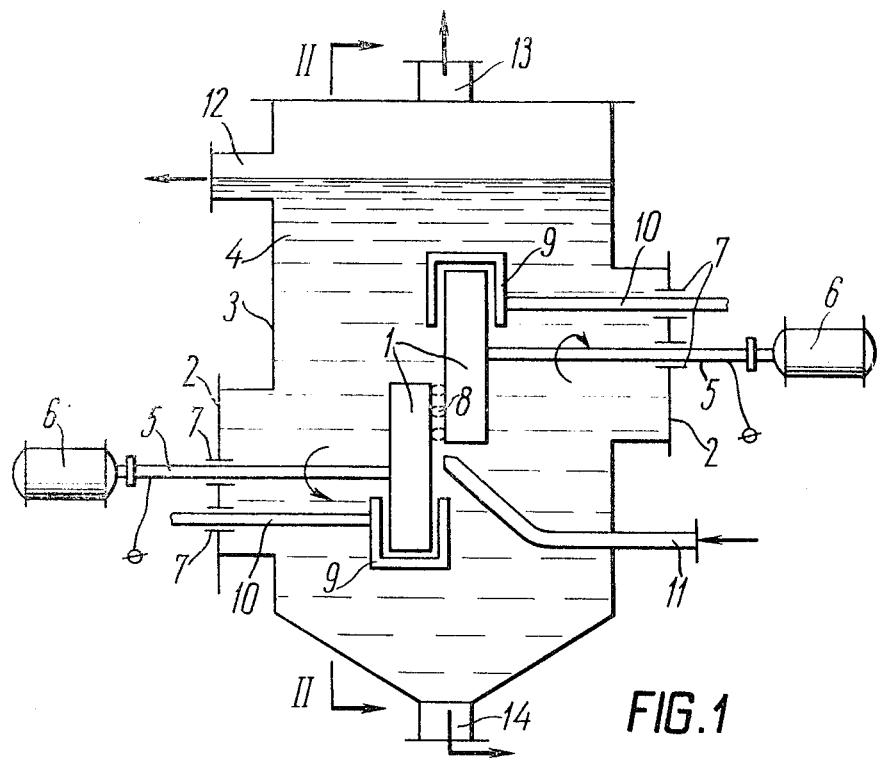
Figure 2:
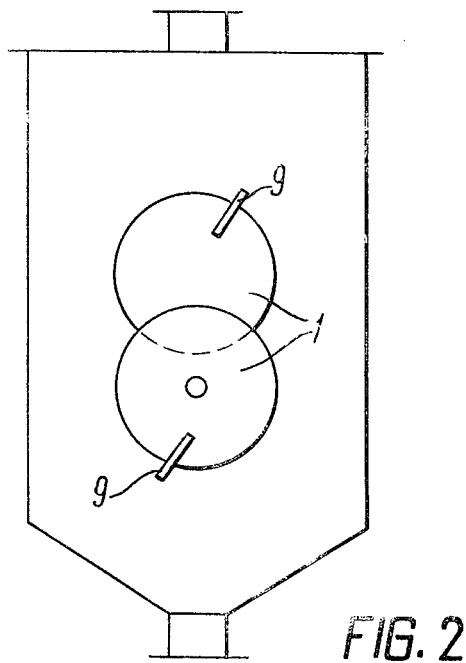
FIG. 2 is a sectional view taken on line II—II of FIG. 1.

The reactor for the decomposition of liquid hydrocarbons by the electric discharge process has two graphite electrodes 1 (FIGS. 1 and 2) made in the form of disks fixed in side walls 2 of metal casing 3 filled with petroleum product 4. To fix electrodes 1, use is made of current-conducting metal rods 5, which are set in rotation in opposite directions by electric motor 6. In walls 2 of casing 3 provision is made for packing glands 7 insulated from the metal walls and accommodating rods 5. Electrodes 1 are disposed so that the projection of the butt end of one electrode overlaps but partially the butt end of the other electrode. To attain this electrode arrangement, rods 5 are displaced in relation to one another by a distance not greater than the diameter of electrodes 1. With the electrodes disposed in this manner, arc zone 8 embraces not the entire butt end surface of electrodes 1, but only a portion thereof. Mounted outside arc zone 8 and in opposite directions are shaped scrapers 9, which serve for cleaning the working surfaces of electrodes 1 from deposited solid products of feedstock decomposition. To mount scrapers 9, use is made of rods 10 passing through packing glands 7 insulated from metal walls 2. One electrode with the respective scraper can be displaced in the longitudinal direction with a view to adjusting the interelectrode distance.

Figure 3:
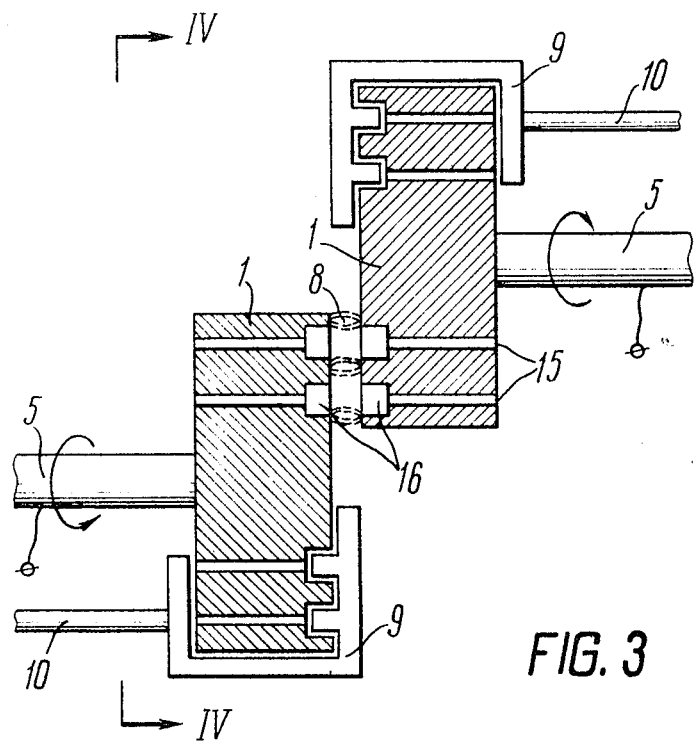
FIG. 3 shows a possible disposition of the electrodes having through-holes.
Figure 4:
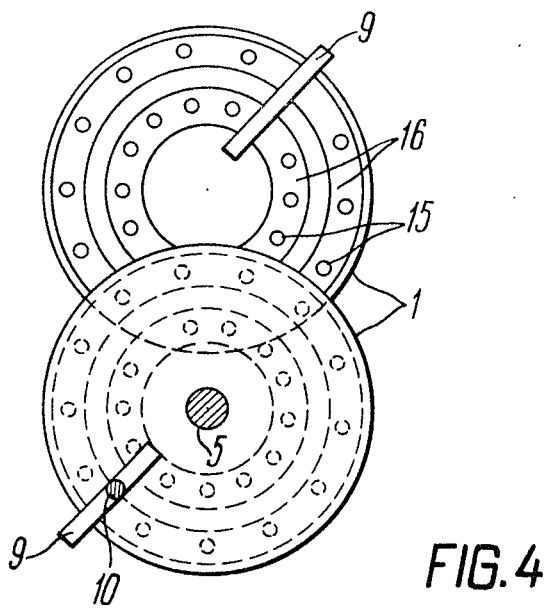
FIG. 4 is a sectional view on line IV—IV of FIG. 3.

Liquid hydrocarbon feedstock is delivered into the reactor via pipeline 11 and leaves the reactor through branch pipe 12. The gases formed in the course of the process leave the reactor through branch pipe 13. Deposits removed by scrapers 9 from electrode surface fall into the bottom part of casing 3 and are periodically discharged therefrom via branch pipe 14. In order to intensify the electric discharge process it is expedient to provide conditions conducive to a rapid exit of the gas formed in the interelectrode space. To do so, in electrodes 1 provision is made for through-holes 15 (FIGS. 3 and 4) disposed on the circumferences concentric with the axis of electrode rotation. The electrode butt ends are furnished with annular grooves 16 accommodating said through-holes. The width of grooves 16 is somewhat greater than the diameter of through-holes 15, thereby causing the arc to burn only between protruding parts of the electrode surfaces that adjoin grooves 16. Scrapers 9 are made so that their protrusions are disposed within annular grooves 16 and effect the removal of deposits from the inner surfaces of said grooves.

The rate of gas discharge from the arc zone can be enhanced by striking the arc between the lateral surfaces of the electrodes. This goal is attained by disposing electrodes 17 (FIGS. 5 and 6) parallel to one another and by causing the electrodes to rotate in opposite directions. Scrapers 18, intended for the removal of solid products of feedstock decomposition from the working surface of electrodes 17, are disposed close to each electrode 17, but outside the arc zone. To facilitate the adjustment of the interelectrode distance, it is expedient to make electrodes 17 in the form of cones whose apices are directed opposite to each other.

In the above-described design modification of the reactors for the decomposition of liquid hydrocarbons by the electric discharge process, the electrodes may be disposed vertically, horizontally or in an inclined position without affecting the principle of reactor operation.

Each design modification of the reactor, according to the present invention, is applicable for carrying out the decomposition of liquid hydrocarbon by any of the known electric discharge techniques involving the employment of direct current as well as single-phase or polyphase alternating current (low-voltage arc, high-voltage arc, low-voltage arc with high-voltage ignition, etc.). The employment of polyphase alternating current calls for an appropriate increase of the number of electrodes and associated scrapers.

If required, a reactor casing may accommodate several independently operated electrode-and-scraper systems described hereinabove.

What is claimed is:

1. A reactor for the decomposition of liquid hydrocarbons by the electric discharge process, said reactor comprising a vessel for containing a liquid hydrocarbon substance to be decomposed, a pair of rotatable substantially flat-faced electrodes supported in said reactor with said faces in juxtaposition to each other and spaced from one another and with said overlapping regions forming an arc zone, means for rotating said electrodes, electrical means for supplying an arc voltage to said electrode, and scrapers mounted adjacent said end faces of the electrodes outside said arc zone for removal of solid decomposition products from said surfaces.

2. A reactor as claimed in claim 1 wherein said electrodes are of disk shape adapted for rotation about respective axes, each electrode having axial holes for removal of gaseous decomposition products, said holes being arranged in each electrode in at least one circumferential array concentric with the axis of rotation of the associated electrode, said end faces of the electrodes having a circumferential groove at each said array of holes, said scrapers including projections extending into said grooves.

3. A reactor as claimed in claim 1 wherein said electrodes are constituted as offset disks rotatable about parallel axes.

References Cited

UNITED STATES PATENTS

| 2,638,443 | 5/1953 | Schoch | 204—170 |
|---|---|---|---|
| 2,862,866 | 12/1958 | Stirnemann et al. | 204—171 |
| 3,332,865 | 7/1967 | Vialaron | 204—170 |

FOREIGN PATENTS

| 120,218 | 7/1945 | Australia. |
|---|---|---|
| 121,376 | 4/1946 | Australia. |

ROBERT K. MIHALEK, Primary Examiner

U.S. Cl. X.R.

204—171